United States Patent
Moon

(10) Patent No.: US 7,859,515 B2
(45) Date of Patent: Dec. 28, 2010

(54) CONTINUOUS CLICK APPARATUS OF MOBILE COMMUNICATION TERMINAL AND METHOD FOR EXECUTING THE SAME

(75) Inventor: Dea-Ho Moon, Gyeongsangnam-Do (KR)

(73) Assignee: LG Electronics Inc., Seoul (KR)

( * ) Notice: Subject to any disclaimer, the term of this patent is extended or adjusted under 35 U.S.C. 154(b) by 731 days.

(21) Appl. No.: 11/435,732

(22) Filed: May 18, 2006

(65) Prior Publication Data
US 2006/0262097 A1 Nov. 23, 2006

(30) Foreign Application Priority Data
May 20, 2005 (KR) ...................... 10-2005-0042699

(51) Int. Cl.
*G09G 5/00* (2006.01)
*G06F 3/02* (2006.01)

(52) U.S. Cl. ...................... 345/156; 345/169

(58) Field of Classification Search ......... 345/156–169, 345/173–181
See application file for complete search history.

(56) References Cited

U.S. PATENT DOCUMENTS 7,429,978 B2 * 9/2008 Yoshioka .................... 345/169

2001/0012790 A1 * 8/2001 Park et al. .................... 455/565
2002/0180622 A1 * 12/2002 Lui et al. ....................... 341/22
2005/0009571 A1 1/2005 Chiam et al.

FOREIGN PATENT DOCUMENTS

| CN | 1340947 A | 3/2002 |
|---|---|---|
| EP | 0 978 989 A2 | 2/2000 |
| GB | 2 349 725 A | 11/2000 |
| JP | 2001-320645 | 11/2001 |
| JP | 2001-350560 A | 12/2001 |
| JP | 2002-142001 A | 5/2002 |
| KR | 2002-0084905 A | 11/2002 |
| KR | 2005-0014081 A | 2/2005 |
| WO | WO 03/044645 A1 | 5/2003 |
| WO | WO 2004/001578 A1 | 1/2004 |
| WO | WO 2006/009692 A3 | 1/2006 |

* cited by examiner

*Primary Examiner*—Duc Q Dinh
(74) *Attorney, Agent, or Firm*—Birch, Stewart, Kolasch & Birch, LLP

(57) ABSTRACT

A mobile communication terminal including an input unit including a plurality of certain keys, a calculator which calculates an interval between a consecutive selection of one of the certain keys, and a processor which executes a predetermined function if the calculated interval is within a threshold time. Further, the predetermined function is set to correspond with the consecutive selection of the one certain key within the threshold time and being different than a function associated with a single selection of the one certain key.

16 Claims, 3 Drawing Sheets

CONTINUOUS CLICK APPARATUS OF MOBILE COMMUNICATION TERMINAL AND METHOD FOR EXECUTING THE SAME

This application claims priority to Korean Application No. 10-2005-0042699 filed in Korea on May 20, 2005, the entire contents of which is hereby incorporated by reference in its entirety.

BACKGROUND OF THE INVENTION

1. Field of the Invention

The present invention relates to a mobile communication terminal and method that allocates predetermined functions to a continuous clicking operation of a directional key on the mobile terminal.

2. Description of the Background Art

Mobile communication service providers provide users with communication functions such as a wireless Internet access service, a VoD (Video on Demand) service, text and multimedia message transmission capabilities, online wireless games, etc. Further, mobile communication terminal manufacturers provide functions not related to communication functions such as a camera function, the ability to write memos or scheduling information, to set an alarm, etc.

As the functions of a mobile communication terminal are diversified, the menus used to access these functions become more complicated, which results in the user having to operate a keypad multiple times to access one function. For instance, a text messaging function includes a variety of menus such as Message Communication Recording menu, Message Multi-queue menu, and Environment Setup and Multimail menu. Thus, to view a received text message, the user has to select several menu options (sub menus) in a top-down order.

For example, FIG. 1 illustrates different menus related to a text messaging capability provided on a mobile terminal. As shown, the user is first provided with a top level message management menu 10. When the user selects the menu 10, a plurality of sub menus 20 are displayed. In this example, the sub menus 20 include a Message communication recording menu 21, a Message multi-queue menu 22, an Environment setup menu 23, and a Multimail menu 24. In addition, when the user selects the Multimail menu 24, another sub menu 30 is displayed providing the user with a plurality of different options. In this example, the sub menu 30 includes the following options: Received message 31, Sent message 32, Text storage box 33, and Message mail 34.

Thus, if a user wants to view a received message, the user selects the Message management menu 10, the Multimail sub menu 10, and the Received message sub menu 31, and then finally selects and views the received message. After viewing the received message in the above manner, if the user wants to send a reply, the user must select a Reply menu among Reply, Resend, Delete and Store number menus, which are sub menus of the Received message menu 31.

Also, the number and use of keys that can be stored in a keypad of the terminal is limited, because the terminal is compact. Therefore, related art terminals allow a specific function to be allocated to a key. The user can then use the direction key as a shortcut key for selection of a desired function (e.g., to dial a home telephone number by pressing and holding a particular key).

However, the related art method is only useful to select a top level menu. Thus, in the related art method, it still takes a lot of time and is troublesome to access a lower menu from an upper menu. That is, the shortcut directional key allows a user to access the top level menus such as Camera shooting menu, Short message menu, MP3 player menu and so on, but does not allow the user to execute an individual function within each menu. Thus, a lower level menu has to be accessed from an upper level by selecting each sub menu, which takes a lot of time and forces the user to visually check each menu/sub menu one by one.

SUMMARY OF THE INVENTION

Accordingly, an object of the present invention is to address the above-noted and other problems.

Another object of the present invention is to provide a method for executing an individual function within each menu by continuously clicking a certain key.

To achieve these and other objects and in accordance with the purpose of the present invention, as embodied and broadly described herein, the present invention provides in one aspect, a mobile communication terminal including an input unit including a plurality of certain keys, a calculator which calculates an interval between a consecutive selection of one of the certain keys, and a processor which executes a predetermined function if the calculated interval is within a threshold time. Further, the predetermined function is set to correspond with the consecutive selection of the one certain key within the threshold time and being different than a function associated with a single selection of the one certain key.

In another aspect, the present invention provides a mobile communication method, including calculating an interval between a consecutive selection of one of a plurality of certain keys included in a mobile terminal, and executing a predetermined function if the calculated interval is within a threshold time. Further, the predetermined function is set to correspond with the consecutive selection of the one certain key within the threshold time and being different than a function associated with a single selection of the one certain key.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings, which are given by illustration only, and thus are not limitative of the present invention, and wherein.

DETAILED DESCRIPTION OF THE PREFERRED EMBODIMENTS

Reference will now be made in detail to the preferred embodiments of the present invention, examples of which are illustrated in the accompanying drawings.

Figure 1:
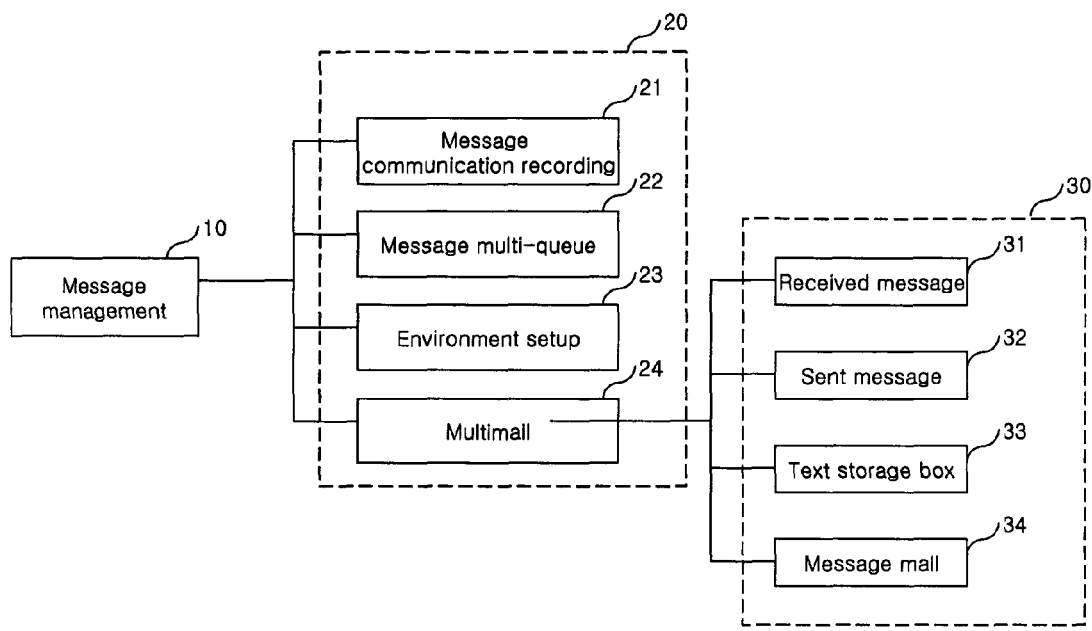
FIG. 1 is an overview showing a general menu pattern.
Figure 2:
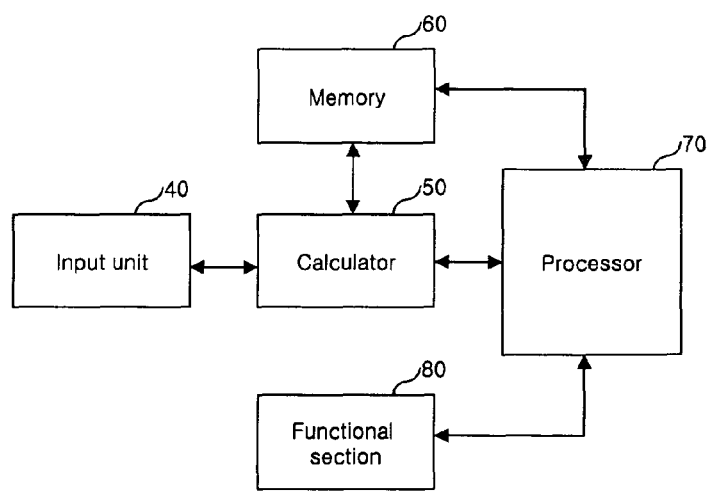
FIG. 2 is a block diagram showing a continuous click apparatus of a mobile communication terminal in accordance with an embodiment of the present invention.

Turning first to FIG. 2, which is a block diagram showing a continuous click apparatus of a mobile communication terminal in accordance with an embodiment of the present invention. As shown, the mobile terminal includes an input unit 40 including a plurality of keys, a calculator 50 for calculating a time difference between continuously input keys, a processor 70 for controlling the terminal according to a calculated result value, and a memory 60 for storing information related to the continuously input keys. Also included is a functional section 80 for executing functions corresponding to the continuously input keys.

An operation of the continuous click apparatus of the mobile terminal in accordance with an embodiment of the present invention will now be described with reference to FIG. 2. In more detail, when keys are continuously input through the input unit 40 (e.g., keypad), the calculator 50 calculates the difference between the time when a first input key and the last input key are selected. For example, in a double-click input operation, the calculator 50 calculates a time between the first key and the second (last) key.

The calculated value is then transmitted to the processor 70. Moreover, once the keys are input, the calculator 50 stores in the memory 60 information representing a status and/or position of a screen and/or position of a cursor right before the keys were selected.

The processor 70 then compares the difference value with a predetermined threshold value stored in the memory 60. If the difference value is greater than the predetermined threshold value, the processor 70 determines the key clicking operation is not a continuous key clicking operation, but rather is individual key clicks. Thus, the processor 70 deletes the information of the keys stored in the memory 70, and executes the function corresponding to each of the consecutively selected keys through the functional section 80.

If the difference value is less than the predetermined threshold value, the processor 70 controls the functional section 80 so as to execute functions previously configured to correspond with the continuously selected keys. In more detail, FIG. 3 is an overview showing a function allocated to a continuous click operation of the mobile terminal in accordance with an embodiment of the present invention.

Figure 3:
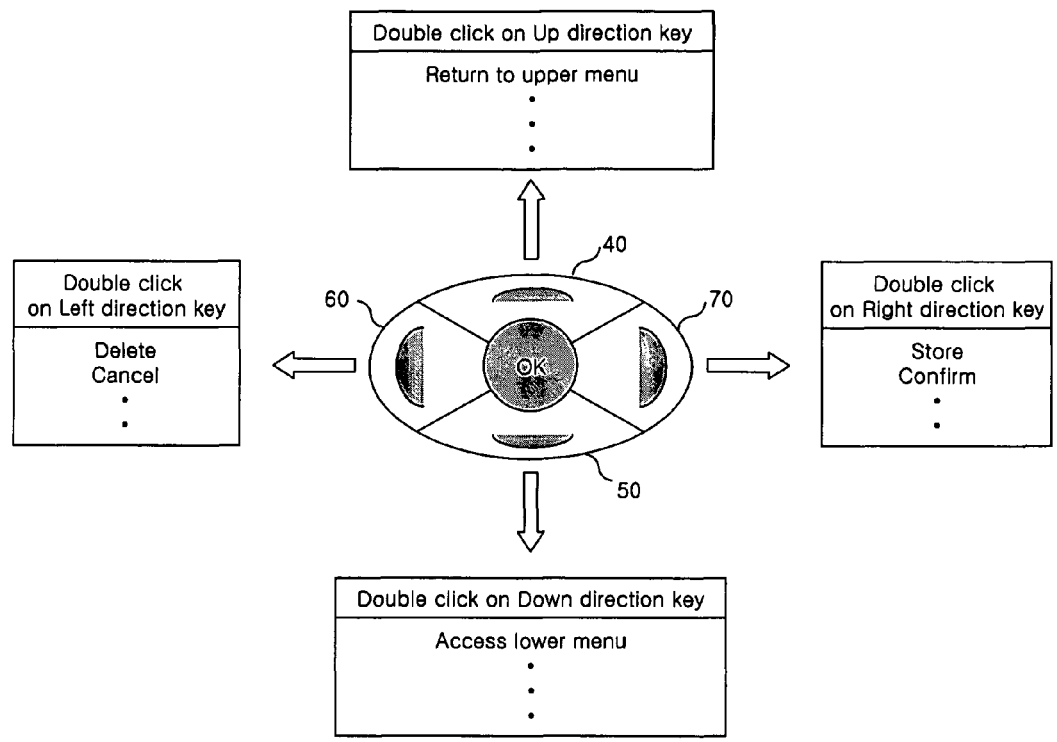
FIG. 3 is an overview showing functions allocated to a continuous click operation of the mobile terminal in accordance with an embodiment of the present invention.

As shown in FIG. 3, a function corresponding to the continuous click of each direction key is allocated based on an intuition that a person feels about up, down, left, and right directions. That is, a double click operation on an Up direction key 40 is allocated to the function of returning to an upper menu from the present menu, and a double click operation on a Down direction key 50 is allocated to the function of accessing a lower menu from a present menu.

Further, a double click operation of a Left direction key 60 is allocated to a function representing a person's negative intuition or rejection such as a Delete or Cancel execution function, and a double click operation of a Right direction key 70 is allocated to a function representing a person's positive intuition or acceptance such as a Store or Confirm execution function. In addition, the functions of the terminal corresponding to each double click are allocated in advance and stored in the memory 60 (FIG. 2) of the terminal, and then if the user double-clicks one of the direction keys, the processor 70 executes the function corresponding to the stored allocations. Note that any number of clicking operations may be used (e.g., double clicking, triple-clicking, etc.)

An operation of executing the functions allocated to the direction keys will now be described in more detail. For example, on a screen where a received short message is displayed, the operation of deleting the short message is performed by double-clicking on the Left direction key 60, and the operation of storing the short message is performed by double-clicking on the Right direction key 70. Further, when a user wants to input a special symbol when writing a text message, a special symbol table can be displayed by double-clicking on the Down direction key 50. Also, the user can return to the previous menu by double-clicking the Up direction key 40.

In addition, the present invention distinguishes between a double click operation and a clicking of the same key in a consecutive manner (i.e., not intending to be a double click operation) by examining a time interval between the first and second (or last) key clicks. Further, when various types of messages (or data) such as a text message, a voice message, an emoticon message and a MMS (multimedia message service) are received on the terminal, the double click operation may be configured to display a popup window showing a list of the various received messages, thereby allowing the user to select one of the various messages.

Figure 4:
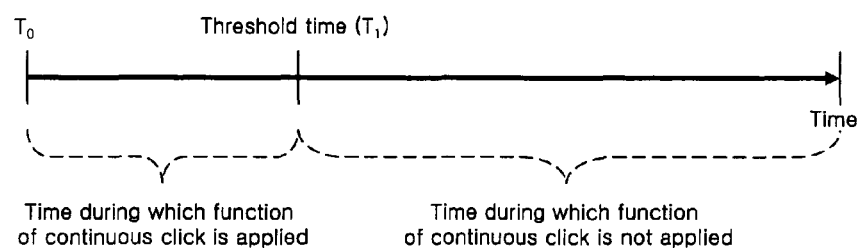
FIG. 4 is a timeline showing reactions according to a time interval of a continuous click operation of the mobile terminal in accordance with an embodiment of the present invention.

Turning next to FIG. 4, which is a timeline showing reactions according to a time interval of the continuous click operation in accordance with an embodiment of the present invention. As shown in FIG. 4, after a first click is performed on one of the input keys, a last click has to be performed on the input key within a predetermined threshold time ($T_1$), which is adjustable by the user.

Further, before the first click on a direction key is performed at a time $T_0$, the terminal stores information representing the status of the screen or the position of the cursor right before the first click operation occurred. Afterwards, if the last click does not occur before the predetermined threshold time $T_1$, the terminal determines that no continuous click operation has occurred, deletes the information stored in the memory and performs the normal function defined for the single selected key.

On the contrary, if the last click is performed before the predetermined threshold time $T_1$, the terminal recalls the status of the screen and/or the position of the cursor stored in the memory and performs the allocated function defined for the continuous click operation. In addition, the predetermined time ($T_1$) can be set by the mobile terminal manufacturer and can be adjusted by the user based on his or her preference.

Figure 5:
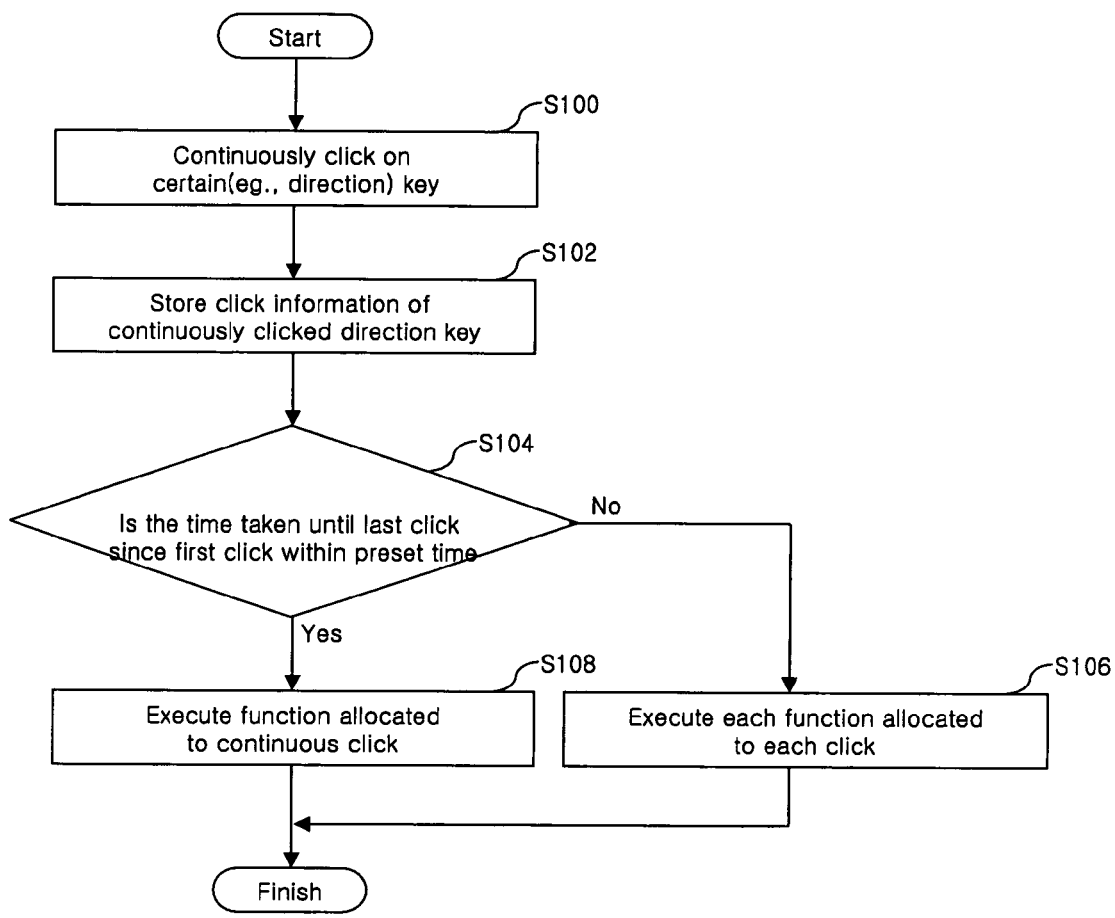
FIG. 5 is a flowchart showing a method for executing a continuous click operation of a mobile terminal.

Turning next to FIG. 5, which is a flowchart showing a method for executing a continuous click of a mobile communication terminal in accordance with an embodiment of the present invention. FIG. 2 will also be referred to in this description.

As shown in FIG. 5, the processor 70 first detects that a certain (eg., direction key) has been clicked or selected by the user (S100), and stores information corresponding the screen before the click operation occurred (S102). Then, the processor 70 determines if a last click occurs before or after the predetermined time period $T_1$, which as discussed above can be first set by the mobile terminal manufacturer and then changed by the user based on his or her preference (S104). If the last click is not performed before the predetermined time period $T_1$ (No in S104), the normal function allocated to the selected direction key is executed (S106). For example, the user may have selected the direction key to move the cursor on the screen. Thus, if the direction key was continuous selected two times, but not before the predetermined time period $T_1$, the cursor would be moved over two places on the screen.

On the contrary, if the last click is performed before the predetermined time period $T_1$ (Yes in S104), the function allocated to the continuous click operation of the direction key is performed. For example, and with reference to FIG. 3, if the right direction key 70 was continuously clicked (e.g., double clicked), a message or phone number, for example, being viewed by the user would be stored in the memory 60. In addition, the user may also be immediately prompted to reply to the phone number or message after it is stored in the memory 60. That is, the double click operation may be set up to immediately display an option allowing the user to reply to the message, rather than having to select a plurality of menu options.

Similarly, if the left direction key 60 was continuously clicked, the message or phone number would be deleted. In addition, if the Up direction key 40 was continuously clicked within the predetermined time period, the previous upper menu would be displayed to the user, and if the Down direction key 50 was continuously selected within the predetermined time period, a corresponding lower menu would be displayed to the user.

As described above, the present invention allows the user to conveniently execute a desired mobile terminal function without requiring a number of input steps.

As the present invention may be embodied in several forms without departing from the spirit or essential characteristics thereof, it should also be understood that the above-described embodiment is not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. A mobile communication terminal, comprising:
    an input unit including a plurality of input keys, wherein the plurality of input keys include up, down, left, and right direction keys;
    a calculator calculating an interval between a consecutive selection of one of the direction; and
    a processor storing information corresponding to a state of the mobile terminal prior to one of the direction keys being selected, and executing a predetermined function corresponding to the consecutive selection of one of the direction keys if the calculated interval is within a threshold time,
    wherein said predetermined function is different from a function associated with a single selection of a corresponding one of the direction keys,
    wherein the predetermined function includes a different predetermined function for each of the direction keys that is allocated based on an intuition,
    wherein continuous selection of the up direction key within the threshold time causes the processor to display a menu that is a higher level menu than a currently displayed menu., continuous selection of the down direction key within the threshold time causes the processor to display a menu that is a lower level menu than the currently displayed menu, and wherein continuous selection of the right direction key within the threshold time causes the processor to store currently displayed data, and continuous selection of the left direction key within the threshold time causes the processor to delete currently displayed data.

2. The mobile communication terminal of claim 1, wherein if the calculated interval is not within the threshold time, the processor executes the function associated with the single selection of the direction key.

3. The mobile communication terminal of claim 2, wherein the processor deletes the stored information corresponding to the state of the mobile terminal if the interval is greater than the threshold time and executes the function.

4. The mobile communication terminal of claim 1, wherein the information corresponds to at least one from a status of a screen and a position of a cursor on a display of the terminal prior to one of the direction keys being selected.

5. The mobile communication terminal of claim 1, wherein the threshold time is variable and can be adjusted by a user of the mobile terminal.

6. The mobile communication terminal of claim 1, wherein said predetermined function is set by at least one from a manufacture of the mobile terminal and a user using the mobile terminal.

7. The mobile communication terminal of claim 1, wherein the processor displays a popup window showing a list of received data when two or more data are received in the terminal and the calculated interval is within the threshold time.

8. The mobile communication terminal of claim 1, wherein the consecutive selection of one of the direction keys within the threshold time comprises a double clicking operation.

9. A method of controlling a mobile terminal, the method comprising:
    detecting a consecutive selection of one of direction keys, wherein the direction keys includes up, down, left and right direction keys;
    storing information corresponding to a state of the mobile terminal prior to one of the direction keys being selected;
    checking whether an interval between the consecutive selection of one of the direction keys is within a threshold time; and
    executing a predetermined function corresponding to the consecutive selection of one of the direction keys if the calculated interval is within the threshold time,
    wherein said predetermined function is different from a function associated with a single selection of a corresponding one of the direction keys,
    wherein the predetermined function includes a different predetermined function for each direction key that is associated based on an intuition,
    wherein continuous selection of the up direction key within the threshold time causes the executing step to display a menu that is a higher level menu than a currently displayed menu, continuous selection of the down direction key within the threshold time causes the executing step to display a menu that is a lower level menu than the currently displayed menu, and
    wherein continuous selection of the right direction key within the threshold time causes the processor to store currently displayed data, and continuous selection of the left direction key within the threshold time causes the processor to delete currently displayed data.

10. The mobile communication method of claim 9, wherein if the calculated interval is not within the threshold time, the executing step executes the function associated with the single selection of the direction keys on the mobile terminal.

11. The mobile communication method of claim 10, further comprising:
  deleting the stored information corresponding to the state of the mobile terminal if the interval is greater than the threshold time; and
  executing the function.

12. The mobile communication method of claim 9, wherein the information corresponds to at least one from a status of a screen and a position of a cursor on a display of the terminal prior to one of direction keys being selected.

13. The mobile communication method of claim 9, wherein the threshold time is variable and can be adjusted by a user of the mobile terminal.

14. The mobile communication method of claim 9, wherein said predetermined function is set by at least one from a manufacture of the mobile terminal and a user using the mobile terminal.

15. The mobile communication method of claim 9, further comprising:
  displaying a popup window showing a list of received data when two or more data are received in the terminal and one of the direction keys is selected within the threshold time.

16. The mobile communication method of claim 9, wherein the consecutive selection of one of the direction keys within the threshold time comprises a double clicking operation.

* * * * *